E. L. RUSSELL.
VALVE ADJUSTER AND DRIVER.
APPLICATION FILED MAR. 16, 1912. RENEWED FEB. 8, 1915.

1,153,709.

Patented Sept. 14, 1915.
2 SHEETS—SHEET 1.

Witnesses
M. H. Fuller
May Layden

Inventor
Edwin L. Russell
By Arthur M. Hood
Attorney

E. L. RUSSELL.
VALVE ADJUSTER AND DRIVER.
APPLICATION FILED MAR. 16, 1912. RENEWED FEB. 8, 1915.
1,153,709.
Patented Sept. 14, 1915.
2 SHEETS—SHEET 2.
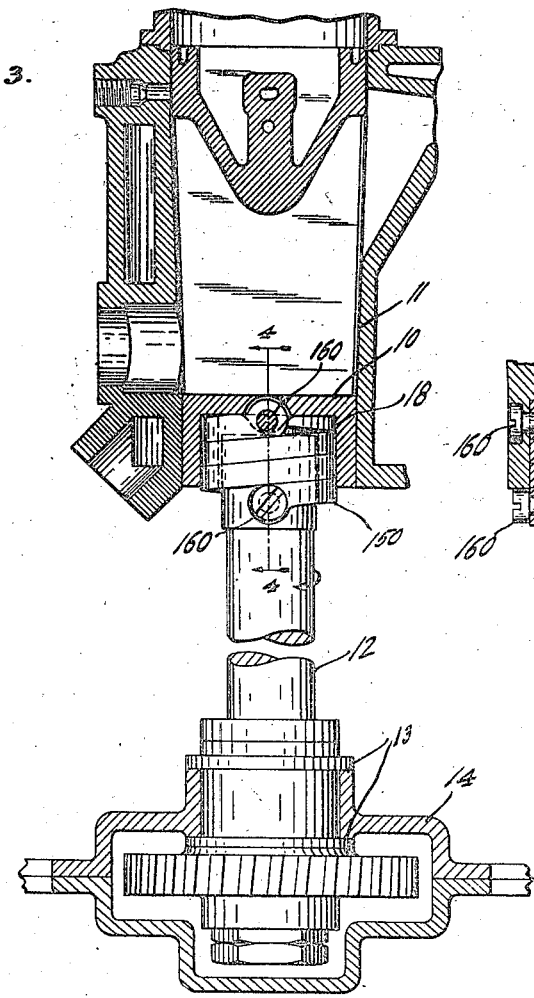
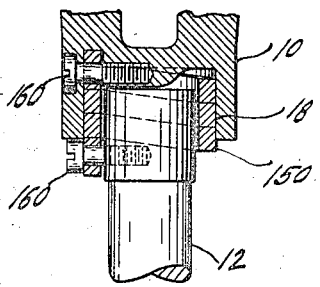
Witnesses
M. H. Fuller
May Layden
Inventor
Edwin L. Russell
By Arthur M. Hood
Attorney

UNITED STATES PATENT OFFICE.

EDWIN L. RUSSELL, OF CLEVELAND, OHIO.

VALVE ADJUSTER AND DRIVER.

1,153,709.

Specification of Letters Patent.   Patented Sept. 14, 1915.

Application filed March 16, 1912, Serial No. 684,312.   Renewed February 8, 1915.   Serial No. 6,804.

*To all whom it may concern:*

Be it known that I, EDWIN L. RUSSELL, a citizen of the United States, residing at Cleveland, in the county of Cuyahoga and State of Ohio, have invented a new and useful Valve Adjuster and Driver, of which the following is a specification.

The object of my invention is to provide a simple connection between a valve or other seated member and its driving member, by means of which, upon undue resistance of the valve to movement along its seat, the valve will be given automatically a sufficient initial movement from its seat to be relieved therefrom.

The accompanying drawings illustrate my invention.

Figure 1:
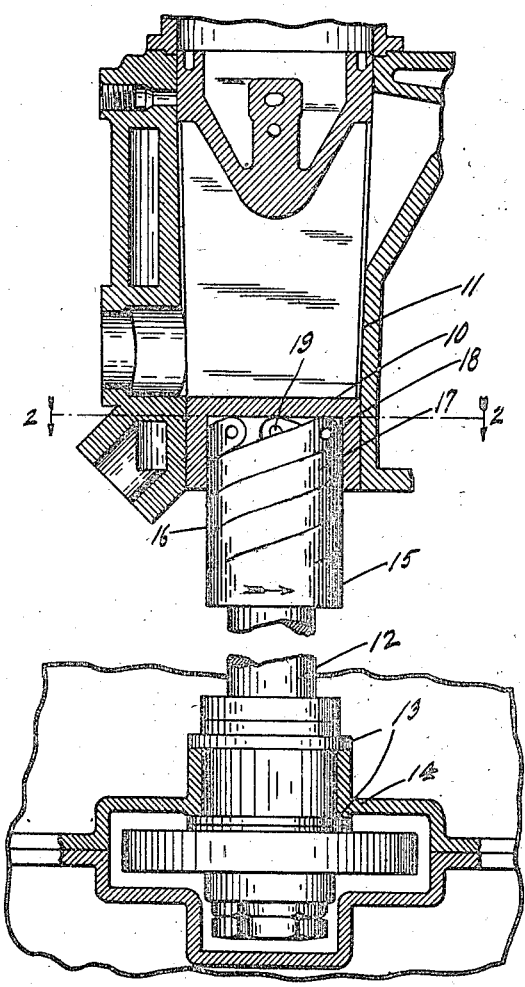
Figure 2:
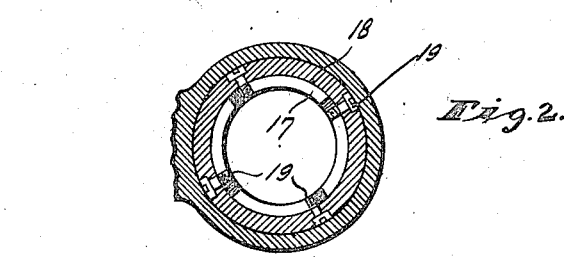

Figure 1 is an axial section of a rotary valve of the ordinary tapered plug type equipped with my improved device; Fig. 2 a section on line 2—2 of Fig. 1; Fig. 3 an axial section of another form, and Fig. 4 a section on line 4—4 of Fig. 3.

In Figs. 1 and 2 of the drawings, 10 indicates an axially tapered valve mounted in a seat or casing 11. The driving shaft 12 is held against axial movement by any suitable means, such as, for instance, flanges 13 and casing 14, and is provided with a tubular head 15 which, by the multiplicity of helical cuts or slots 16 is formed into a plurality of helical spring fingers 17 which, at their free ends are projected into a pocket 18 formed in the end of the valve 10 and secured to the valve by any suitable means, such as pins or screws 19. These helices are then brought into contact with each other before tempering.

The operation is as follows: Shaft 12 is driven in the direction indicated by the arrow and under normal conditions valve 10 will be driven in the same direction through the medium of the springs 17. If there be undue resistance of the valve 10 to movement along its seat (*i. e.*, rotative movement) there will be a slight forward movement of shaft 12 relative to the free ends of the spring fingers 17, thus resulting in an axial projection of the free ends of the fingers 17 and thus serving to project the valve 10 axially away from its seat. If the shaft be rotated in the opposite direction, and there be undue resistance of the valve to motion, the shaft-ends of the helices will be wound up, or tightened, relative to the valve ends and there will be a conification of the nest of helices which will result in an axial elongation which will push the valve from its seat.

In Figs. 3 and 4, 10 indicates an axially tapered rotary valve seated in a correspondingly tapered casing or seat 11. The rotary driving shaft 12 is held against axial movement by any suitable means such as flanges 13 and casing 14. Wrapped around the end of shaft 12 is a spring helix 150 one end of which is attached to shaft 12 and the other end of which is projected into a pocket 18, formed in the adjacent end of valve 10, and anchored at 160 to said valve. The internal diameter of the helix 150 exceeds the external diameter of that portion of shaft 12 which is projected into it and the external diameter of the helix is the same as the bore of pocket 18. The several turns of the helix 150 are in contact with each other and the adjacent surfaces are preferably lubricated as to be readily movable upon each other.

If the shaft 12 be rotated in the direction indicated by the arrow and there be no abnormal resistance offered by valve 10 to movement along its seat, the valve will be driven along its seat without any shifting of the driving end of the helix relative to the driven end, but if there be abnormal resistance of valve 10, the driving end of the helix 150 will be advanced relative to the driven end and will thus be slipped beneath the adjacent coils of the helix thereby decreasing the diameter of the helix and at the same time shoving the adjacent coils of the helix, and consequently the driven end thereof, axially of the shaft so as to thus lift the valve 10 from its seat enough to overcome the abnormal resistance to movement along its seat whereupon the helix will tend to resume its normal condition and bring the valve 10 into synchronism with the shaft. If the shaft 12 be rotated in the opposite direction, as for instance the case would be if the structure were in an internal combustion engine where the parts came into momentary rest with the piston on the compressing side of the dead center, and if under such conditions there were abnormal resistance to rotative movement of the valve 10, the driving end of the helix 150 would be shifted relative to the driven end and, as there can be no increase in diameter of the helix, there would of necessity be an axial lengthening of the helix and a consequent axial shifting of the driven end of the helix thus serving to drive the valve away from its seat enough to release it from its abnormal resistance, whereupon the spring of the helix would tend to bring the parts into their normal relationship again.

I claim as my invention:

1. The combination of a seat member, a seated member movable both along and away from the seat member, a driving member movable in the direction of movement of the seated member along the seat member, and a spring finger connected at one end to the driving member and at the other end to the seat member and lying at an angle both to the direction of movement of the seated member along the seat member and to the direction of movement of the seated member away from the seat member said spring finger having sufficient stiffness in the direction of movement of the seated member away from the seat member to project said seated member away from its seat when the finger is abnormally stressed by the driving member.

2. The combination of an axially tapered seat, and axially tapered rotary seated member therein, a rotary driving member, and a connection between the driving member and the seated member comprising one or more helical spring fingers anchored at one end to the driving member and anchored at the other end to the seated member.

3. The combination of an axially tapered seat, an axially tapered rotary seated member therein, a rotary driving member, and a connection between the driving member and the seated member consisting of a tube of spring metal slit at one end with a multiplicity of helical slots into a plurality of helical spring fingers, said tube and fingers being secured at their opposite ends to the driving member and seated member.

4. The combination of an axially tapered seat, a correspondingly tapered rotary seated member mounted thereon, a rotary driving shaft, and a spring helix having helical portions in contact with other helical portions, one end of said helix being anchored to the seated member and the other end of said helix being anchored to the driving shaft and with the axis of the helix in substantial alinement with the axis of the shaft and seated member.

5. The combination of a seat, a corresponding rotary seated member mounted thereon, a rotary driving shaft, and a spring helix having helical portions in contact with other helical portions, one end of said helix being anchored to the seated member and the other end of said helix being anchored to the driving shaft and with the axis of the helix in substantial alinement with the axis of the shaft and seated member.

6. The combination of an axially tapered seat, an axially tapered rotary seated member therein capable of axial movement relative to the seat member, a rotary driving member, connecting means between said seat member and driving member whereby on a change in resistance of the seated member to rotary movement said seated member will be automatically moved relative to the seat member in an axial direction said means comprising a torsional helical spring.

In witness whereof, I have hereunto set my hand and seal at Indianapolis, Indiana, this 9th day of March, A. D. one thousand nine hundred and 12.

EDWIN L. RUSSELL. [L. S.]

Witnesses:
  ARTHUR M. HOOD,
  G. B. SCHLEY.